(12) United States Patent
Tsai et al.

(10) Patent No.: US 6,804,443 B2
(45) Date of Patent: Oct. 12, 2004

(54) TEST STRUCTURE AND METHOD OF STEP COVERAGE FOR OPTICAL WAVEGUIDE PRODUCTION

(75) Inventors: Po-Hao Tsai, Hsinchu (TW);
Jing-Hung Chiou, Hsinchu (TW);
Kai-Hsiang Yen, Hsinchu (TW);
Wen-Jiun Liu, Hsinchu (TW);
Yuh-Wen Lee, Hsinchu (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 10/601,647

(22) Filed: Jun. 24, 2003

(65) Prior Publication Data
US 2004/0081417 A1 Apr. 29, 2004

(30) Foreign Application Priority Data
Oct. 25, 2002 (TW) ...................................... 91125291 A

(51) Int. Cl.[7] ................................................ G02B 6/10
(52) U.S. Cl. ...................................................... 385/129
(58) Field of Search .................................. 385/129, 130, 385/131, 132

(56) References Cited

U.S. PATENT DOCUMENTS
5,267,336 A * 11/1993 Sriram et al. .................. 385/2

OTHER PUBLICATIONS
Cheng et al., Appl. Phys. Lett. 58 (19), May 13, 1991, 1991 American Institute of Physics, pp. 2147–2149.

* cited by examiner

Primary Examiner—Frank G. Font
Assistant Examiner—Michael P. Mooney
(74) Attorney, Agent, or Firm—Birch, Stewart, Kolasch & Birch, LLP

(57) ABSTRACT

Test structure and method of step coverage for optical waveguide production are disclosed. It combines the steps of producing the optical waveguide and the testing structure by forming the optical waveguide components on the chip and the test structure in the surrounding areas, so the optical waveguide and the test structure have the same upper covering layer. Etching solution is used for the etch testing of the test structure, and the step coverage of the upper covering layer for the optical waveguide is extrapolated by the etching result.

11 Claims, 4 Drawing Sheets

TEST STRUCTURE AND METHOD OF STEP COVERAGE FOR OPTICAL WAVEGUIDE PRODUCTION

BACKGROUND OF THE INVENTION

1. Field of Invention

The invention is related to the test structure and its method. In particular, the invention relates to test structure and its method of the step coverage for optical waveguide production.

2. Related Art

As the Internet and networks are more widely used and multimedia more popular, there is an increasing need for broader bandwidth. Optical technology plays an extremely important role in the future of data transmission. Dense Wavelength Division Multiplexing, DWDM, is the one of the best methods for increasing bandwidth and transmission volume. It uses different wavelengths sharing the same fiber. Multiple data signals are transmitted using relative but different wavelengths through the wavelength divider on a single mode fiber. They are later separated into single light waves that normally operate on the single mode fiber. Therefore, data from different sources can be placed on a single mode fiber and increase the transmission efficiency of the optical broadband.

A complete dense wavelength division multiplexing system includes the transceivers, multiplexers/demultiplexers, optical fiber amplifiers (such as EDFA, erbium-doped fiber amplifiers), add-drop multiplexers, dispersion compensation devices, EMI filters, optical routers and other optical communication components, electrical circuitries, racks, etc. The multiplexer is an important element for separating the wavelengths. The current technology for producing multiplexers includes: light filtering, fiber grading, fiber coupling, waveguiding etc; there are commercial products available using these technologies. The optical waveguide element is capable of functioning over 64 wavelengths and is suitable for long-distance network communications. It is also highly sensitive and is not affected by electromagnetic waves; it can be used in different environment. The Planar Light wave Circuits, PLCs, are a technique using semiconductors to produce light wave circuitries on a plane for functions like: multiplexing, demultiplexing optical switching, etc.

The normal planar light wave circuits use silicon chips as base material, and deposit three layers with different rates of refraction on top. The top and bottom layers are cladding layers. The rate of refraction is n2; the middle layer is a waveguiding layer with a higher rate of refraction at n1 (n1>n2). The three layers have similar fiber-structures. The front most point is a tool for entering and exiting of light waves; it guides multiple wavelengths into one optical output. Three depositing layers, limiting the light wave to the middle layer and transmitting them to the grading area, form the optical waveguide. This special grading area is a combined structure of normal light, dividing grades and focusing lens. When light waves hit the combined grading area, they reflect and divide, then move through the waveguiding layer and go back to the existing point. The originally mixed multiple wavelengths are then separated when existing. Since the planar optical waveguide construction follows a semiconductor process, it has the advantages of high stability, availability for mass production, and integratability. Controlling the refraction rate of the upper covering layer and the step coverage rate decides the quality of the final product. Before executing the final steps such as face polishing, the annealing process step is needed to finish the step coverage on the upper covering layer. However, it is difficult to determine if the step coverage of the covering layer is completed during the annealing process. If the step coverage of the upper covering layer is not ideal, once the face polishing process starts, it is too late to reverse the process. Determining if the efficiency of the step coverage of the upper covering layer is acceptable for the optical waveguide production, prior to the face polishing process, is an important quality control element.

The 1991 issue of *Appl. Phys. Lett.* published an article titled "New test structure to identify step coverage mechanisms in chemical vapor deposition of silicon dioxide", which included a new test structure and method of the step coverage. It uses the semi-conductor production method, constructing a cavity to test the step coverage. However, the cavity and the actual optical waveguide structure are very different. Also, hydrogen fluoride is required to form the cavity, which does not work for the optical waveguide structures with oxidation layers.

SUMMARY OF THE INVENTION

To solve the problems of the known technology, an appropriate step coverage test structure and method is required. This invention introduces a step coverage test structure and method for the optical waveguide production, which uses the silicon deep etching technique at the edge of the optical waveguide chip to create trench test structures. This allows instant etching test of the structure using etching solution and the result shows the step coverage of the upper covering layer on the optical waveguide chip.

The invention combines the production of the optical waveguide and the test structures, which co-exist on the optical waveguide chip, and uses a trench test structure to test the edge of the optical waveguide chip. This test area and the optical waveguide area have an identical upper covering layer, therefore, using the direct etching test to exam the step coverage, the step coverage of the optical waveguide can be extrapolated.

The testing method of the step coverage of the optical waveguide production described by this invention is made possible by creating a testing area during the optical waveguide production and tests the covering layer directly; the steps include: providing a substrate area with a covering layer; forming the waveguide layer on top of the oxidation layer; forming a covering layer on top of the waveguide layer using the method of micro-imaging, exposing only the test area; erasing the covering layer and the waveguide layer of the test area and exposing the substrate; creating the test structure in the shape optical waveguide in the test area; creating an optical waveguide structure on the waveguide layer and erasing the covering layer; depositing an upper covering layer completely over the test structure and the optical waveguide structure, and completing the optical waveguide structure; executing the annealing process for the whole substrate; and dropping etching solution on the test structure to test the step coverage of the upper covering layer. Multiple test structures can be constructed on the substrate outside of the optical waveguide area, for testing the step coverage after recovering procedures, if needed. For example, if it is discovered that the annealing procedure is not completed after testing, the process can be repeated, and other test structures can be used to test the step coverage until the annealing procedure is completed. Continuing the optical waveguide production with a face polishing process after ensuring the quality of the step coverage increases the production success.

Further scope of applicability of the present invention will become apparent from the detailed description given below. However, it should be understood that the detailed description and specific examples, while indicating preferred embodiments of the invention, is given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given in the illustration below only, and thus is not limitative of the present invention.

DETAILED DESCRIPTION OF THE INVENTION

Figure 1:
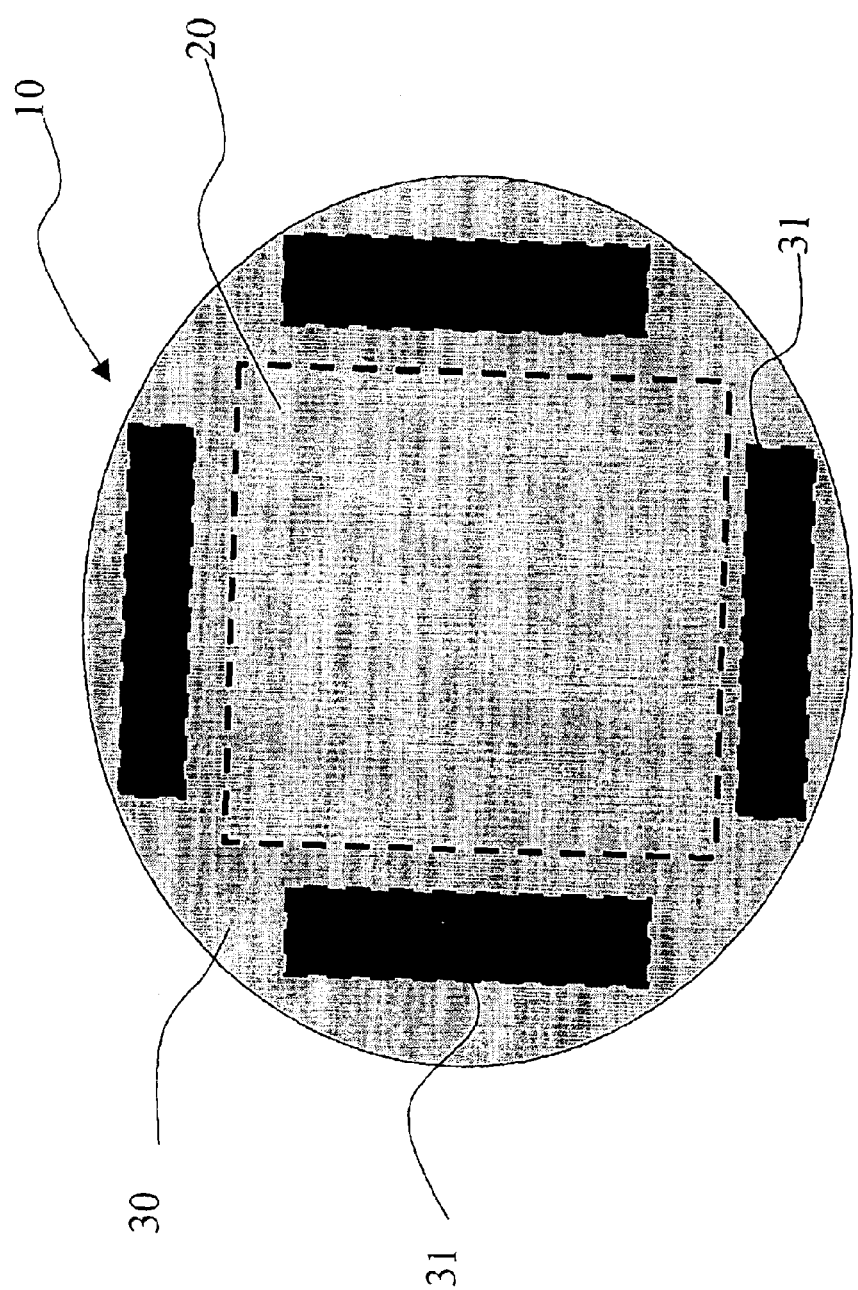
FIG. 1 illustrates the structure of the optical waveguide chip.

Please refer to FIG. 1 for the structure diagram of the invention. T the optical waveguide area (20) and the test area (30) are on the edge of an optical waveguide chip (10). The trench style test structure (31) is constructed in the area on the edge of the optical waveguide chip (10) outside of the optical waveguide area (20) and used as test area (30). As shown in FIG. 1, there are several test structures (31) surrounding the optical waveguide area (20). They have the same upper covering layer as the optical waveguide area (20). Performing a direct etching test on the test area (30) on the test structure's (31) step coverage allows the extrapolation of the step coverage of the optical waveguide structure (20). Anneal the upper covering layer, processed to increase the step coverage of the test structure (31) and the optical waveguide (20).

Figure 2:
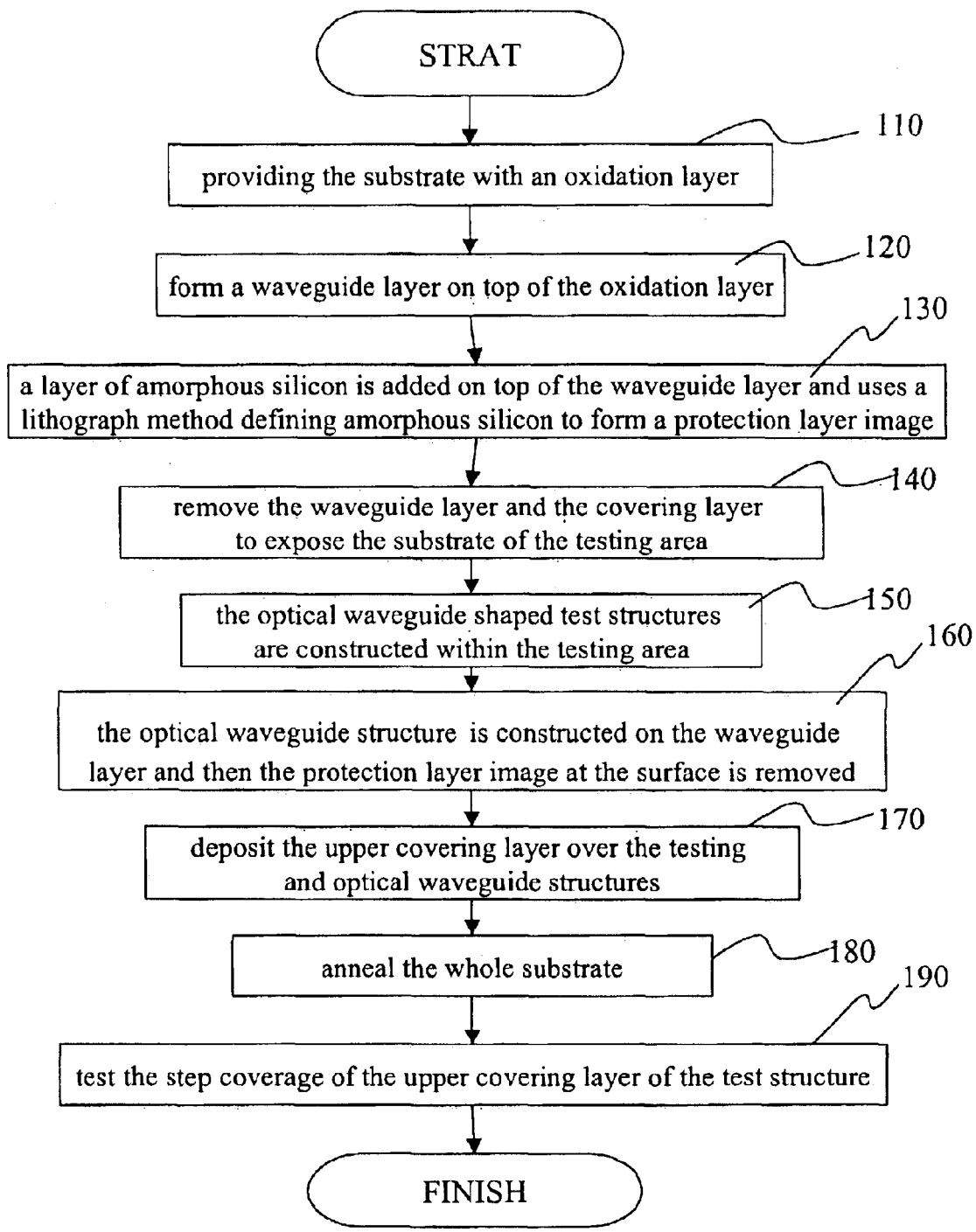
FIG. 2 illustrates, in flow diagram form, the procedures of the invention.

The testing method of the step coverage uses silicon deep etching technique to create the test structure, and then test the step coverage of the upper covering layer. Please refer to FIG. 2 for the flow diagram of the invention. The testing steps include providing a substrate with an oxidation layer (step 110), of 5 mm to 7 mm width. Form a waveguide layer on top of the oxidation layer (step 120), of 5 mm to 6 mm width (the oxidation layer and the waveguide layer are created using the PECVD method). A layer of amorphous silicon is added on top of the waveguide layer and uses a lithograph method defining amorphous silicon to form a protection layer image (step 130), so the protection layer covers the appointed optical waveguide area. The area exposed from the protection layer image is the test area. ICP, a composite gas made up of $SF_6$, $O_2$, $C_4F_8$, is used for shaping amorphous silicon. The Buffered Oxide Etch, BOE, made up of HF and $NH_4F$ in a 6:1 ratio, is used to remove the waveguide layer and the covering layer, to expose the substrate of the testing area (step 140). The optical waveguide shaped test structures are constructed within the testing area (step 150). After removing the front photoresistant protection layer, a micro-imaging method is used to form a protection layer on the waveguide layer. Using a reactive ion etching process, the optical waveguide structure is constructed on the waveguide layer and then the protection layer image at the surface is removed (step 160). The Plasma Enhanced Chemical Vapor Deposition method is used to deposit the upper covering layer over the testing and optical waveguide structures (step 170). The optical waveguide structure and the upper covering layer form the optical waveguide structure, anneal the whole substrate (step 180). Etching solution, such as the BOE, is then dropped on the test structure to test the step coverage of the upper covering layer of the test structure (step 190).

Figure 3:
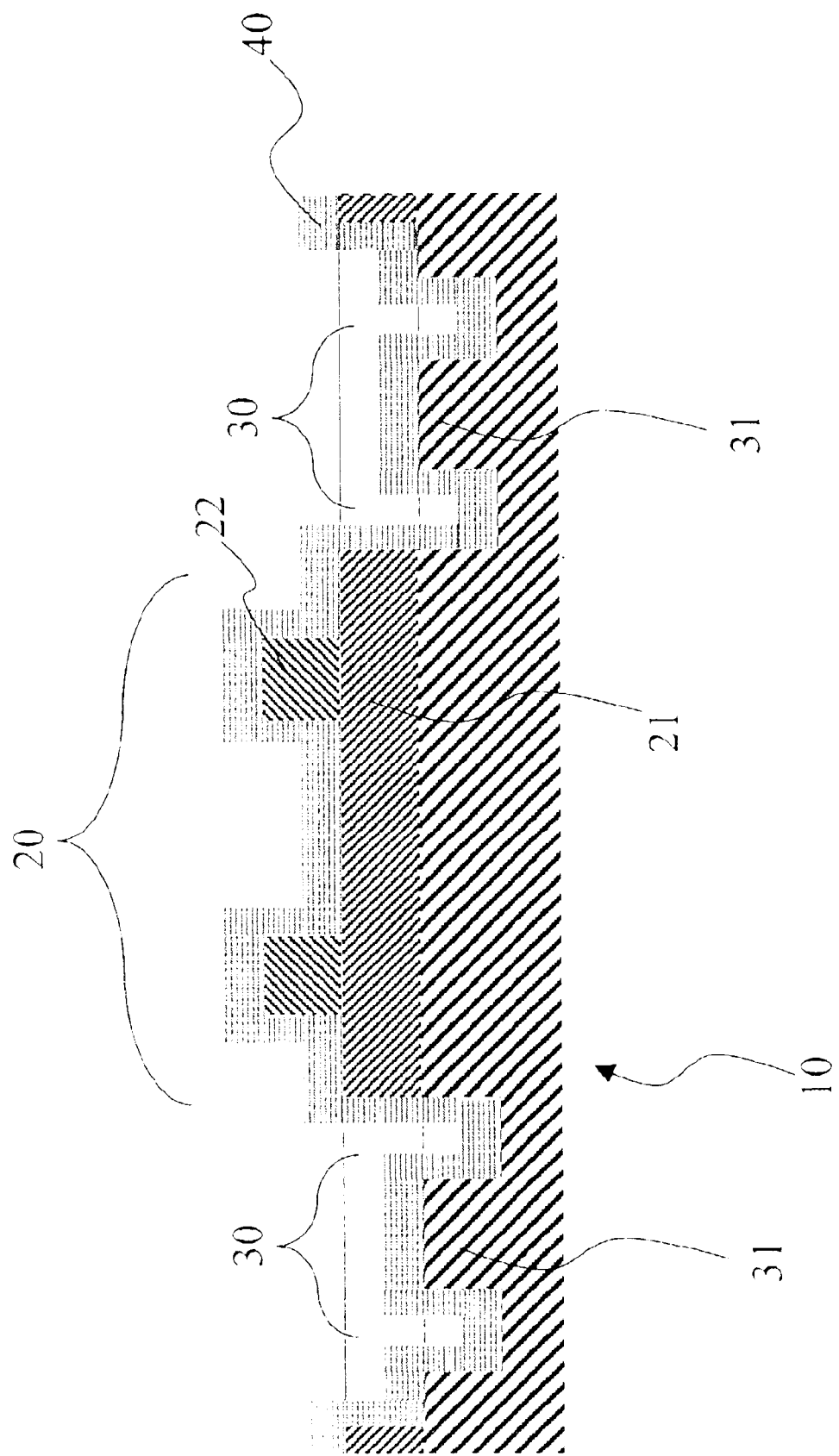
FIG. 3 illustrates the cross section of the optical waveguide chip.

For better explanation of the testing condition, please refer to FIG. 3 for the cross section view of the optical waveguide chip. The surface of the optical waveguide chip (10) has the optical waveguide area (20) and testing area on the edge (30). The optical waveguide area has the optical waveguide structure (22), covering an upper covering layer (40) and a lower covering layer (21), which is the oxidation layer. The testing area (30) has at least one test structure (31), and it has the same upper covering layer (40) as the optical waveguide structure (22) in the optical waveguide area (20). This allows the direct etching of the test area (30) to test the step coverage of the upper layer (40), to extrapolate the step coverage rate of the optical waveguide structure.

Figure 4:
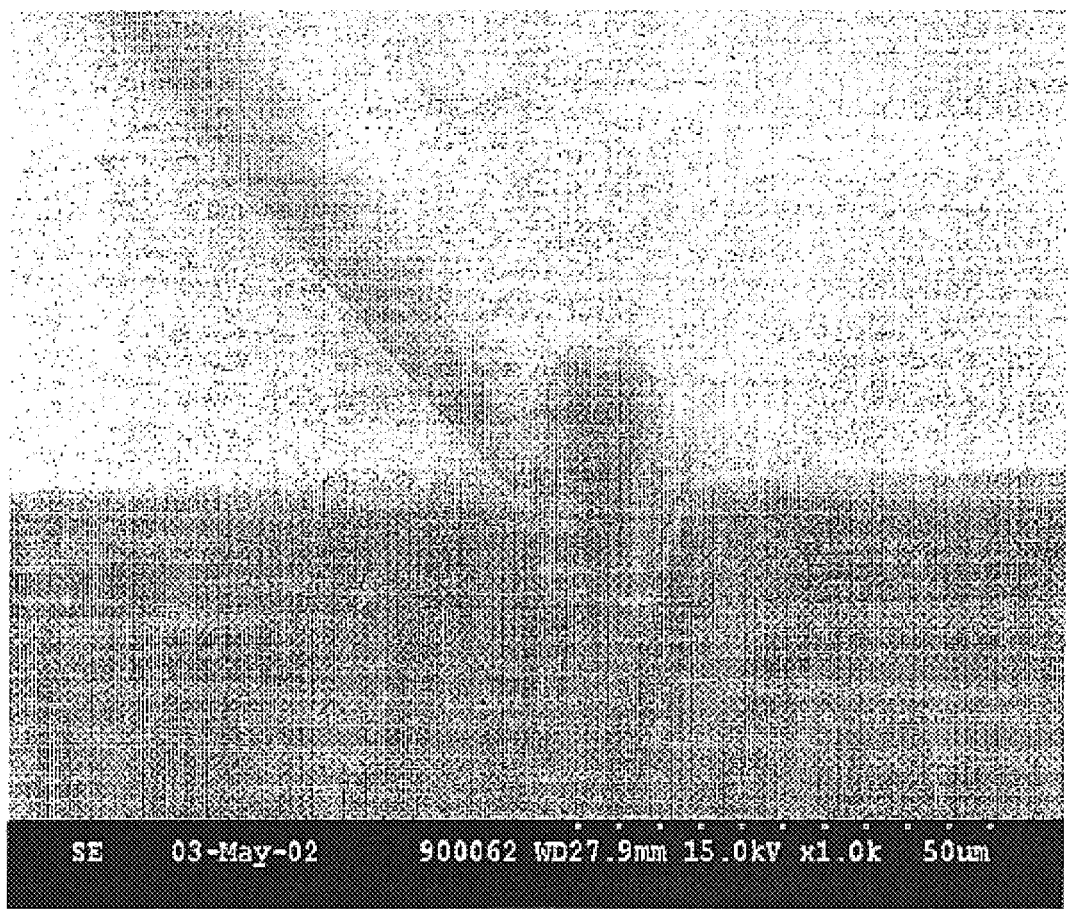
FIG. 4 is an electronic microscopic picture of the etching solution dropped on the test structure.

Also, the substrate can construct multiple test structures in the remainder area outside of the optical waveguide area. Therefore, when it is determined that the annealing process is not completed after the first step coverage test on a test structure, as shown in FIG. 4 with the electronic microscope picture of the etching solution dropped on the test structure, the annealing procedure is repeated to improve the step coverage. Another test structure is used to test the step coverage again until the annealing process is successful. Finally, the optical waveguide structure undergoes processes such as surface polishing, and increases the production efficiency. The annealing process is a heat treatment (1100 degrees Celsius) for one to six hours, according to necessity in a nitrogen protected environment.

Reading the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Test structure of the step coverage for optical waveguide production, which comprises a substrate with a optical waveguide structure, is characterized in that: at least one test structure is constructed at the remainder area outside the optical waveguide structure and has the same upper covering layer as the optical waveguide structure; and step coverage of the upper covering layer is tested by direct etching and the step coverage of the optical waveguide structure is extrapolated.

2. Test structure of the step coverage for optical waveguide production of claim 1 wherein the test structures are trench test structures.

3. Test structure of the step coverage for optical waveguide production of claim 1 wherein the test structures are completed by the silicon deep etching technology.

4. Test structure of the step coverage for optical waveguide production of claim 1 wherein the test structures use wet etching method to test the step coverage of the upper covering layer.

5. Test structure of the step coverage for optical waveguide production of claim 1 wherein the test structures use the annealing process to increase the step coverage of the upper covering layer over the test structure and the optical waveguide structure.

6. Test method of the step coverage for optical waveguide production, comprises the steps of:
   a. providing a substrate with a covering layer on the surface;
   b. forming a waveguide layer on top of the covering layer;
   c. forming a protection layer image using lithograph method over the waveguide layer, which covers the appointed optical waveguide structure area;
   d. setting a test area in the area left out by the protection layer image and erasing the waveguide layer and the covering layer to expose the substrate;
   e. constructing at least one test structure in the shape of the optical waveguide structure in the test area;
   f. constructing a waveguide structure on the waveguide layer and removing the protection layer image;
   g. depositing a upper covering layer to cover the test structure and the waveguide structure completely and forming the optical waveguide structure with the waveguide structure and the upper covering layer;
   h. executing annealing treatment to the substrate; and
   i. etching the test structure for testing the step coverage of the upper layer on the test structure and extrapolate the step coverage of the optical waveguide structure.

7. Test method of the step coverage for optical waveguide production of claim 6 wherein the test method comprises the repeating of steps h to step i after discovering the annealing process is incomplete after step i, until the annealing process is completed.

8. Test method of the step coverage for optical waveguide production of claim 6 wherein refraction rate of the covering layer and the upper covering layer are smaller than the refraction rate of the waveguide structure.

9. Test method of the step coverage for optical waveguide production of claim 6 wherein the test structures are trench test structures.

10. Test method of the step coverage for optical waveguide production of claim 6 wherein the etching test of the test structure comprises the steps of using wet etching to test the step coverage rate of the upper covering layer.

11. Test method of the step coverage for optical waveguide production of claim 6 wherein the annealing process step is a heat treatment in a nitrogen environment at 1100 degrees Celsius for one to six hours.

* * * * *